Dec. 26, 1933.                    H. H. LOGAN                    1,940,871
                                SHOCK ABSORBER
                              Filed May 2, 1929
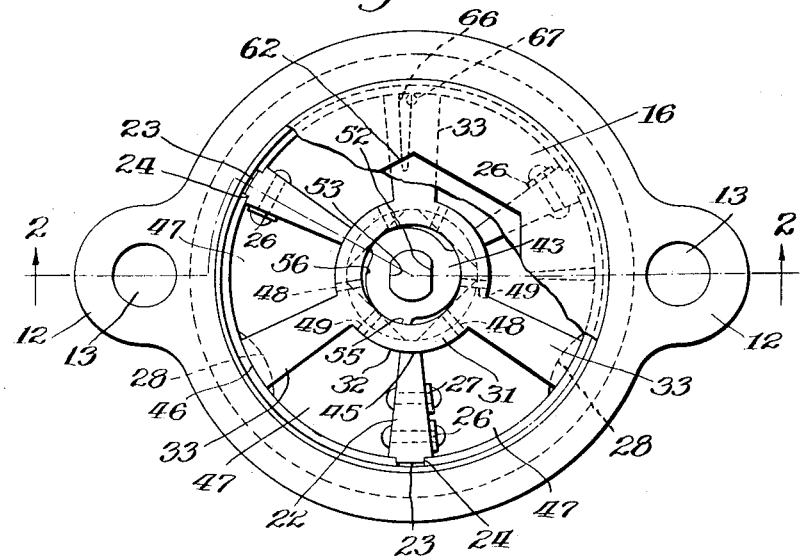
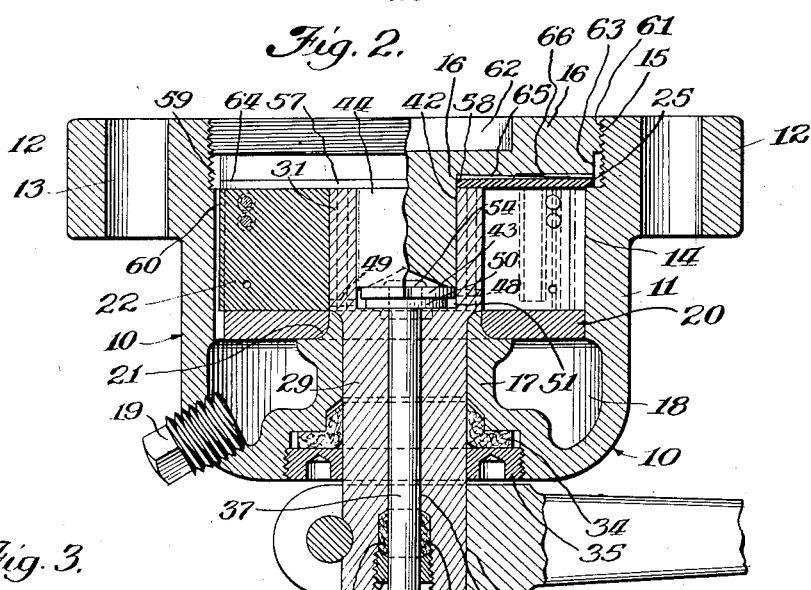
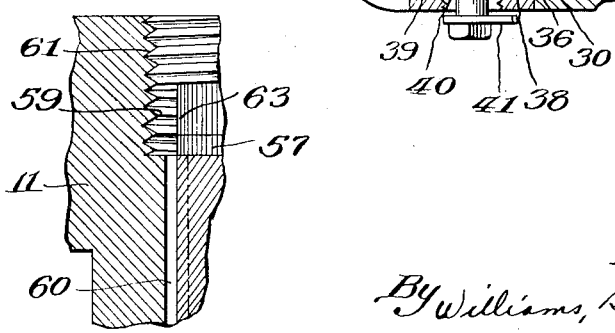
Inventor
Henry H. Logan
By Williams, Bradbury, McCaleb & Hinkle
Attys.

Patented Dec. 26, 1933

1,940,871

UNITED STATES PATENT OFFICE 1,940,871

SHOCK ABSORBER

Henry H. Logan, Chicago, Ill.

Application May 2, 1929. Serial No. 359,760

11 Claims. (Cl. 188—89)

The present invention relates to shock absorbers and is particularly concerned with improvements in hydraulic shock absorbers for automotive vehicles or the like.

One of the objects of the invention is the provision of an improved form of throttling mechanism of the same general type shown in my prior Patent No. 1,693,340, issued November 27, 1928, on shock absorbers, which mechanism may be more economically manufactured and assembled than the devices of the prior art.

Another object is the provision of an improved construction having a novel pressure releasing device adapted to by-pass the hydraulic fluid at a predetermined pressure for preventing injury to the metal parts of the shock absorber under extreme strains such as those resulting from extraordinary shocks in cold weather.

Another object is the provision of an improved commercial structure for shock absorbers of the same general type disclosed in my prior patent above mentioned, including certain novel elements which may be more economically constructed by the use of sheet metal stampings, thereby eliminating many of the machining operations which would otherwise be necessary.

Other objects and advantages of the invention will be apparent from the following description and from the accompanying drawing, in which similar characters of reference indicate similar parts throughout the several views.

Referring to the single sheet of drawings accompanying this description,

Figure 1 is an elevational view of the rear side of the shock absorber with the cover partially broken away to show the internal mechanism;

Figure 2 is a sectional view taken on the plane of the line 2—2 in Figure 1, with certain of the parts in partial cross section; and Figure 3 is an enlarged detail view of a part of Figure 2, illustrating more clearly the construction of the shock absorber with certain conduits.

The embodiment chosen to illustrate the invention is a shock absorber which may be substantially identical in construction with the shock absorber disclosed in my prior patent above mentioned, with the exception of the throttling mechanism and the pressure releasing device described in detail hereinafter, and the operation of the shock absorber is also substantially the same except for the variations which are introduced by the improvements described herein. I desire it to be understood, however, that the improved construction, which is the subject of the present application, is of general application to many types of hydraulic shock absorbers and is not limited to the specific construction set forth in the prior patent other than as specified in the appended claims.

Referring to Figures 1 and 2, the shock absorber which is indicated in its entirety by the numeral 10 may consist of a metal casing 11 of substantially cylindrical shape having laterally projecting lugs 12 with apertures 13 for securing the shock absorber to a vehicle part, and having a substantially cylindrical chamber 14 provided with an open end 15 adapted to be closed by a cover 16. The casing 11 is preferably formed with an integral bearing 17 located at the end opposite from the cover 16 and extending into the shock absorber forming an annular reservoir 18 provided with a filling plug 19.

The reservoir 18 and chamber 14 are separated by a metal partition 20 which is seated in the cylindrical chamber 14 upon an annular shoulder 21 carried by the bearing 17 and the partition 20 supports a plurality of radially extending fixed vanes 22 secured against rotation in the shock absorber by having ribs 23 located in slots 24 in the cylindrical wall of the chamber 14. The fixed vanes 22 extend axially of the chamber 14, to a point determined by the location of the annular shoulder or seat 25 formed in the open end 15 of the shock absorber casing 11, and the fixed vanes 22 are provided with one-way by-pass valves indicated diagrammatically at 26, of substantially the same construction shown in said prior patent. One of the vanes 22 is also provided with a one-way feed valve 27 for automatically replenishing the supply of hydraulic fluid in the chamber 14 from the supply in the reservoir 18.

The partition 20 is also formed with by-passes 28 comprising slots located midway between the vanes 22 and adapted to permit relatively free movement of the shock absorber parts about a normal position.

The shock absorber 10 is provided with a movable element 29 including a shaft 30 rotatably mounted in the bearing 17 and provided with a hub 31 having a substantially cylindrical surface 32 and having a plurality of radially extending movable vanes 33. The shaft 30 is formed to fit accurately in the bearing 17 and the shaft is also provided with a packing 34 secured by a gland 35 to prevent leakage about the shaft.

The shaft 30 is also provided with an axially located bore 36 adapted to receive the actuating shaft or stem 37 of a throttling mechanism, and the shaft 30 is also provided with a counterbore 38 for receiving a packing 39 secured by the gland 40 about the shaft 37. The indicating mechanism 41 carried by the end of the shaft 37 may be identical with that disclosed in my prior patent.

At its inner end the shaft 30 is provided with a counterbore 42 adapted to receive the throttling mechanism which may consist of a single plate 43, and also adapted to receive an inwardly extending boss 44 carried by the cover 16 and adapted to provide an additional bearing for the shaft 30.

The axial length of the movable vanes 33 is likewise determined by the location of the annular shoulder or seat 25 for the cover 16 and the fixed vanes 22 are provided with curved surfaces 45 at their inner edges, complementary to the curved cylindrical surface 32 of the hub 31. The movable vanes 33 are also provided with cylindrical curved surfaces 46 at their outer edges, complementary to the cylindrical surface of the chamber 14, so that the fixed and movable vanes divide the chamber 14 of the shock absorber into a plurality of relatively small chambers 47 located between the vanes and adapted to be filled with hydraulic fluid.

In order to provide an adjustable by-pass for the hydraulic fluid from one of the chambers 47 to another of the chambers 47, the hub 31 is provided with pairs of by-pass conduits 48 and 49, one located on each side of each movable vane 33 adjacent the movable vane and extending into the counterbore 42. The bores or conduits 48, in the present embodiment, are preferably located in substantially the same plane, that is, a plane at right angles to the axis of the shaft 30 and so located that all of the conduits 48 register with the throttling plate 43 which should be of a thickness adapted to substantially close the bores 48.

The bores 48, 49 and counterbore 42 constitute conduits leading from one side of a movable vane 33 to the other side of said vane, and consequently it is only necessary to provide throttling means at one point in each conduit, and the bores 49 may all be located in another plane adapted to register with a washer 50 carried by the throttling shaft 37. The bores 49 are thus all in communication with a common annular chamber 51 extending about the washer 50 in the counterbore 42.

The throttling plate 43 may comprise a sheet metal stamping having a non-circular aperture 52 adapted to receive the flattened end 53 of the shaft 37. The flattening of the end of the shaft 37 at 53 forms shoulders on said shaft and the throttling plate 43 may be secured between said shoulders and the end of the shaft which is riveted over at 54.

The throttling plate 43 is of sufficient thickness to cover the bores 48 and the plate is formed substantially like a cam having similar throttling surfaces for each of the bores 48. Thus in the present embodiment the throttling plate is provided with substantially cylindrical surface 55 adapted to completely close a bore 48, and extending circumferentially from the cylindrical surface 55 about the plate is a surface 56 formed with a radius of decreasing value so that as the plate 43 is rotated the surface 56 gradually recedes from a position in front of the bore 48 and the conduit formed by the bore 48 may be completely closed or adjustably throttled by means of the plate 43. The structure of the plates adjacent the other bores 48 is identical with that just described and consequently all of the by-pass conduits extending about the movable vanes are simultaneously throttled.

The present throttling mechanism is very economically manufactured, since it merely includes a single plate which may be made of a metal stamping, and the adjustment which may be secured thereby is much finer than that which is accomplished by the throttling mechanisms of the prior art which are also expensive to manufacture.

In order to provide the shock absorber with a pressure releasing device for preventing injury to the metal parts under extreme strains, the open end 15 of the shock absorber casing 11 may be provided with a movable wall which is responsive to a predetermined degree of pressure in the chambers 47, and the movable wall may consist of a resilient metal plate 57 of substantially disc shape having a centrally located aperture 58 for receiving the cylindrical lug 44 on the cover 16. The metal plate 57 is of a size adapted to be received in the open end 15 of the casing 11 and to be seated upon the annular shoulder or seat 25 without obstructing the annular leakage chamber 59 formed between the cover 16 and seat 25 and without obstructing the leakage conduits 60 leading from the annular chamber 59 to the reservoir 18.

The cover 16 may consist of a metal member having a substantially cylindrical threaded surface 61 adapted to be received in the threaded counterbore 15 which forms the open end of the casing 11 and the cover is provided with a non-circular socket 62 for receiving a wrench or other tool. Inside of the cylindrical threaded surface 61 the cover is reduced in diameter, as at 63, to form the annular chamber 59 and the cylindrical portion 63 of the cover is substantially the same in size as the resilient plate 57 so that the inner edge 64 of the cover is adapted to engage outside of the metal plate 57 to force the metal plate 57 into close engagement with the seat 25 of casing 11 to effect a fluid-tight closure of the casing. Any leakage which escapes past the seat 25 out of the chambers 47 will, however, be collected in the leakage chamber 59 and conducted back to the reservoir 18 by the conduits 60, substantially as disclosed in my prior application, case 2, on shock absorbers, filed December 6, 1928, Serial No. 324,119.

In order to provide room for movement of the resilient wall 57, the cover 16 is formed with a recess or pressure release chamber 65 which may consist of a slight concavity about the cylindrical lug 44, and the cover is also preferably provided with a plurality of radially extending grooves 66 extending from the recess 65 to the outer edge of the cover and communicating with the annular conduit 59. The grooves 66 appear to be tapered in depth due to the concavity of the recess 65 and the grooves or conduits 66 are adapted to permit any leakage which may pass the resilient wall 57 into the recess 65, to find its way back into the annular leakage chamber 59 and thence through the conduits 60 to the reservoir 18. The partition 20 is also provided with the air conduit 67 and all of the details of the shock absorber not specifically described herein may be substantially as shown in my prior patent above mentioned.

The operation of the shock absorber under normal conditions is substantially the same as that of the shock absorber described in my patent, but when the metal parts of the shock absorber are subjected to extreme strain, such as may be the case when the wheels of the vehicle receive a severe shock during cold weather when the hydraulic fluid is relatively thick, the resilient metal plate 57 is adapted to be sprung toward the recess 65 by the pressure of the hydraulic fluid in chambers 47, the resilient wall simultaneously bypassing a portion of the hydraulic fluid about all of the movable and fixed vanes against which it normally slidably engages.

My present cover is also adapted to close the shock absorber without the necessity for the use of packing and any leakage which may pass the primary seat of the cover cannot build up a pressure in the recess behind the resilient wall nor in the annular chamber below the engaging threads because the leakage fluid will be conveyed back to the reservoir without building up any substantial pressure.

The operation of the throttling mechanism has already been described.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a hydraulic shock absorber, the combination of a casing having a movable vane mounted therein, with a resilient metal member forming a part of the wall of said casing and slidably engaged by said vane, said casing having a seating surface to receive said resilient member, and a casing cover having a recess adjacent said resilient metal member whereby said member is adapted to flex under predetermined pressure to by-pass fluid around said vane, said cover clamping said resilient member against said seating surface.

2. In a hydraulic shock absorber, the combination of a casing having a movable vane mounted therein, with a resilient metal member forming a part of the wall of said casing and slidably engaged by said vane, said casing having a recess adjacent said resilient metal member whereby said member is adapted to flex under predetermined pressure to by-pass fluid around said vane, said casing having a fluid reservoir and having a conduit leading from said recess to said reservoir to relieve pressure in said recess.

3. In a shock absorber, a throttling mechanism comprising a shaft provided with a plurality of vanes, and a bore, said shaft also having by-pass conduits located adjacent the vanes in a substantially common plane and extending into said bore, a throttle shaft in said bore having a single cam-shaped member of sufficient width to close said conduits, said member having a plurality of surfaces formed with a decreasing radius to gradually open said conduits.

4. In a shock absorber, the combination of a casing, having a plurality of fixed vanes, with a rotatable shaft having a hub and plurality of movable vanes, said hub having a bore and pairs of conduits extending into said bore adjacent said movable vanes, one of each pair of conduits being located in the same plane axially of said shaft, and a single cam-shaped plate rotatably mounted in said bore to throttle said latter conduits.

5. In a shock absorber, the combination of a casing with a plurality of fixed vanes therein, a rotatable shaft having a plurality of movable vanes rotatably mounted in said casing, said casing having an open end and an annular shoulder adjacent said end, a resilient metal member seated on said annular shoulder and forming a wall of said chamber, said resilient member being adapted to flex to by-pass fluid about said vanes, and a recessed cover for closing said casing and clamping the outer edge of said resilient member against said shoulder.

6. In a shock absorber, the combination of a casing with a plurality of fixed vanes therein, a rotatable shaft having a plurality of movable vanes rotatably mounted in said casing, said casing having an open end and an annular shoulder adjacent said end, a resilient metal member seated on said annular shoulder and forming a wall of said chamber, said resilient member being adapted to flex to by-pass fluid about said vanes, and a recessed cover for closing said casing and clamping the outer edge of said resilient member against said shoulder, said casing having a reservoir and conduits leading from said reservoir to the recess in said cover.

7. In a shock absorber, the combination of a casing with a movable member having a shaft and a movable vane, a resilient diaphragm forming one of the end walls of said casing and adapted to be slidably engaged by said vane, said diaphragm and shaft having an aperture to receive a bearing lug, and a cover for said casing having a bearing lug passing through said diaphragm into said aperture in said shaft, said diaphragm being adapted to give to by-pass fluid around said vane.

8. In a shock absorber, the combintion of a casing having a working chamber, a reservoir, and a pressure release chamber, a resilient diaphragm forming a common wall of said working chamber and said pressure release chamber and adapted to flex into said pressure release chamber to by-pass fluid in said working chamber, and conduits leading from said pressure release chamber to said reservoir to prevent the building up of pressure by leakage into said pressure release chamber.

9. In a shock absorber, the combination of a casing having a working chamber, a reservoir, and a pressure release chamber, a resilient diaphragm forming a common wall of said working chamber and said pressure release chamber and adapted to flex into said pressure release chamber to by-pass fluid in said working chamber, conduits leading from said pressure release chamber to said reservoir to prevent the building up of pressure by leakage into said pressure release chamber, and a plurality of fixed vanes in said working chamber and a plurality of movable vanes between said fixed vanes, said diaphragm being adapted to engage and by-pass both movable and fixed vanes.

10. In a shock absorber, the combination of a casing, with a movable member having a rotatable shaft and a movable vane carried by said shaft, a resilient diaphragm carried by said casing transversely to said shaft and adapted to by-pass fluid from one side of said vane to the other, and a cover for clamping said diaphragm in said casing and effecting a liquid tight closure of said casing.

11. A liquid type shock absorber comprising a liquid-containing, substantially cylindrical chamber, a rotary spindle coaxially journalled therein, a wing piston forming a rigid part of such spindle with its free end fitting the chamber wall, and a movable chamber end wall extending transversely of said spindle and adapted to yield under liquid pressure to form a liquid flow passage between itself and the edge of the piston.

HENRY H. LOGAN.